3,086,844
PROCESS FOR THE MANUFACTURE OF NEUTRALIZATION PRODUCTS FROM PHOSPHORIC ACID AND SODIUM CARBONATE
Klaus Beltz and Franz Rodis, Knapsack, near Cologne, Germany, assignors to Knapsack-Griesheim Aktiengesellschaft, Knapsack, near Cologne, Germany, a corporation of Germany
No Drawing. Filed June 7, 1960, Ser. No. 34,350
Claims priority, application Germany, June 13, 1959
1 Claim. (Cl. 23—107)

The present invention relates to a process for the manufacture of neutralization products from phosphoric acid and sodium carbonate.

Phosphoric acid and anhydrous sodium carbonate are frequently used in industry as starting materials for making sodium phosphates, especially condensed sodium phosphates, such as tetrasodium pyrophosphate and sodium tripolyphosphate. In other instances, thermal phosphoric acid which is obtained by the combustion of elementary phosphorus is used. The concentration of thermal phosphoric acid is very high and generally varies between 60 and 90% $H_3PO_4$.

It is, however, rather difficult to neutralize such highly concentrated phosphoric acid with sodium carbonate. When the two reactants are mixed with one another, for example in a molar ratio of $P_2O_5:Na_2O$ of 3:5 or 1:2, the neutralization proceeds initially rather rapidly, but with the formation of a large amount of voluminous foam, so that large apparatus provided with efficient stirring means have to be employed. In the end, a viscous, foamy magma of sodium phosphate solution, crystals of monosodium and disodium orthophosphate and unreacted sodium carbonate, which due to its being in contact with the aqueous phase is agglomerated to form tough lumps, is obtained. These lumps of sodium carbonate react extremely slowly. In other words, the reaction which should proceed in the manner illustrated by the summation Equations 1 or 2 below comes prematurely to a standstill.

(1) 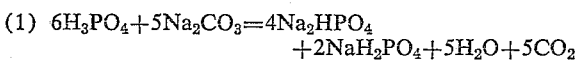
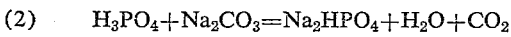

(2) $H_3PO_4 + Na_2CO_3 = Na_2HPO_4 + H_2O + CO_2$

The subsequent reaction of the heterogeneous magma so obtained with splitting off of $CO_2$ and a further formation of sodium phosphate proceeds the more rapidly the more water is present and the higher the temperature.

In order to eliminate these difficulties water is added in carrying out the neutralization reaction on an industrial scale so that the preponderant proportion or the total amount of the neutralization products, i.e. the primary and secondary sodium orthophosphates, are obtained in the form of their aqueous solutions. As already mentioned above, the water has the effect of eliminating the difficulties described above. The water may be added by diluting phosphoric acid with water prior to neutralization, or by suspending sodium carbonate in water or by introducing phosphoric acid, sodium carbonate and water into one reaction vessel. In processing the sodium phosphate solutions so obtained in order to produce anhydrous phosphates, especially condensed phosphates, the water previously added has to be removed by evaporation. The heat balance of such process is therefore unsatisfactory.

We have now found that concentrated phosphoric acid and sodium carbonate can be made into a crystalline magma of sodium orthophosphate without adding water or adding only a small amount of water. The crystalline magma is free from sodium carbonate lumps and has substantially reacted. In order to obtain said crystalline magma, the amounts of sodium carbonate and phosphoric acid required are alternately introduced in portions into a vessel provided with a stirring means. The sodium carbonate is always introduced as the first component which is suspended in a sodium phosphate solution or suspension neutralized to the $Na_2HPO_4$-stage and uniformly stirred. The phosphoric acid is introduced as the second component in an amount equivalent to the sodium carbonate proportion in order to obtain $Na_2HPO_4$.

In view of the fact that $Na_2HPO_4$-solutions or suspensions do not react with the sodium carbonate with splitting off of $CO_2$, the sodium carbonate is first mixed with and finely distributed in the liquid mixture and then reacted with phosphoric acid with splitting off of $CO_2$, whereby the formation of lumps of sodium carbonate is completely avoided. It is admitted that a foam does also form upon adding phosphoric acid to the sodium carbonate-sodium phosphate suspension, but this foam is not very voluminous and has a very short lifetime as compared with the foam which is obtained by neutralizing concentrated phosphoric acid with dry sodium carbonate. The process of this invention avoids all those difficulties which are involved in that case where acid and sodium carbonate are continuously and jointly added to a solution or suspension of disodium orthophosphate, whereby a mixture is obtained that continuously evolves $CO_2$ so that the introduction of sodium carbonate into such mixture results in lump formation and annoying foam formation.

In accordance with this invention, phosphoric acid and sodium carbonate are neutralized in stepwise manner. The first step is to prepare a small quantity of a solution or suspension of disodium orthophosphate, which may emanate from a previous batch or may be prepared by neutralizing phosphoric acid with sodium carbonate while adding water. The aforesaid small amount of disodium orthophosphate solution or suspension serves to suspend and finely distribute the first portion of sodium carbonate. The sodium carbonate so "wetted" is then neutralized by adding the first portion of phosphoric acid. This cycle is repeated until the batch has the desired volume. When the last portion of acid is added, the desired ratio of $Na_2O:P_2O_5$ is exactly adjusted.

The neutralization products prepared by the process of this invention from phosphoric acid and sodium carbonate constitute suspensions of sodium orthophosphates in a saturated sodium orthophosphate solution. The suspensions so obtained can be processed in known manner. Thus, for example, a suspension of disodium orthophosphate in saturated disodium orthophosphate solution can be heated to a temperature above 200° C., whereby tetrasodium pyrophosphate is obtained. A suspension, which contains monosodium and disodium phosphate in a molar ratio of 1:2 (which includes the total amount of the two phosphates), can be heated to a temperature above 300° C. whereby sodium triphosphate is obtained. Phosphate suspensions of other composition yield on being heated condensed phosphates of corresponding composition or mixtures of condensed phosphates.

Aqueous sodium orthophosphate suspensions can be converted by heating into condensed sodium phosphates using apparatus of the most various design or more especially a rotary kiln or a spraying tower.

The following statements show that the process of this invention is distinctly superior to the known processes of treating sodium orthophosphate solutions.

A disodium orthophosphate solution saturated at 90° C. contains 25.1% $P_2O_5$, 21.9% $Na_2O$ and 53.0% $H_2O$. In order to prepare from that solution 1 kg. anhydrous tetrasodium pyrophosphate, 1.13 kg. $H_2O$ must be evaporated. Contrary thereto, a disodium orthophosphate suspension prepared by the process of this invention contains, for example, 37.0% $P_2O_5$, 32.3% $Na_2O$ and 30.7%

$H_2O$. In order to prepare from that suspension 1 kg. anhydrous tetrasodium pyrophosphate, 0.443 kg. $H_2O$ must be evaporated, i.e. scarcely 40% of the amount necessary for processing the solution.

The process of this invention can be used with advantage in all cases where condensed sodium phosphates are prepared from a phosphoric acid which contains $H_3PO_4$ in a concentration above 40% or more especially above 50%. Less concentrated phosphoric acids react with sodium carbonate with the formation of aqueous solutions of orthophosphates. With the use of a phosphoric acid of higher concentration, it was hitherto necessary to add water in order to obtain sodium orthophosphate solutions which are used as intermediates for the production of condensed phosphates. The water added had then to be removed by evaporation. The technical advance achieved by the process of this invention resides in the fact that no water or only immaterial amounts of water have to be used. This means that heat energy is saved during the subsequent heating which is carried out to obtain condensed phosphates. In addition thereto, the production capacity of the plant used, for example a spraying plant or rotatory kiln plant, is considerably increased.

The process of this invention can also be used for manufacture of solid orthophosphates. In this case, the suspensions obtained must only be dried. Alternatively, the hot suspensions are allowed to cool, whereby the water is bound as water of crystallization and the mass solidifies.

The following examples serve to illustrate the invention, but they are not intended to limit it thereto:

Example 1

A stirring vessel made of stainless steel and heated from the outside (capacity: 2000 liters) contained 750 kg. of an aqueous disodium-orthophosphate suspension as rest of a previous batch. The suspension which was intensely stirred at a temperature of about 90° C., contained 34% $P_2O_5$ and 29.7% $Na_2O$. 389 kg. finely gound and calcined sodium carbonae (57.3% $Na_2O$) were introduced into said suspension and thoroughly stirred. No carbon dioxide was practically evolved. 378 kg. phosphoric acid (62.1% $H_3PO_4$) were then run in. The phosphoric acid reacted with the suspended sodium carbonate with spontaneous evolution of carbon dioxide. After 10–15 minutes, the reaction was substantially complete. Sodium carbonate and phosphoric acid were then added twice exactly in the same manner as described above. About 3,000 kg. of a crystalline magma of disodium orthophosphate containing 34.0% $P_2O_5$ and 29.7% $Na_2O$ were obtained.

The mixture contained only 0.1–0.2% $CO_2$. These data indicated that the mixture contained only very minor amounts of unreacted sodium carbonate. During the whole neutralization process, the contents of the vessel were intensely stirred and heating was so regulated that the temperature amounted to 90–95° C. About 50 kg. water evaporated from the mixture. The crystalline magma of disodium orthophosphate obtained was sprayed through heated conduits and with the aid of a pump and a pressure atomizing nozzle into a spraying tower, in which the said magma was converted into tetrasodium pyrophosphate at a temperature of 300–350° C.

Example 2

The apparatus was the same as that employed in Example 1. The crude materials were added in the following amounts and sequence:

250 liters water
450 kg. sodium carbonate (55.5% $Na_2O$)
524 kg. phosphoric acid (76.5% $H_3PO_4$)
170 kg. sodium carbonate
197 kg. phosphoric acid
170 kg. sodium carbonate
197. kg. phosphoric acid
170 kg. sodium carbonate
197 kg. phosphoric acid When the phosphoric acid had been added in each case, the whole was allowed to stand for 10–15 minutes during which time the sodium carbonate reacted with the phosphoric acid while stirring. After all had been added, the suspension was stirred for about 30 minutes; the suspension was then substantially free from carbon dioxide and could be processed without difficulty. Altogether about 80 kg. water evaporated. The suspension contained 37.5% $P_2O_5$ and 32.5% $Na_2O$, and was converted into anhydrous tetrasodium pyrophosphate in the manner described in Example 1.

Example 3

In order to prepare sodium tripolyphosphate, a sodium orthophosphate suspension was prepared which contained monosodium orthophosphate and disodium orthophosphate in a molar ratio of about 1:2. The suspension was prepared in the manner described in Example 2 with the exception that the acid added as last portion was added in an amount greater than indicated in that example in order to obtain the desired composition. The reaction partners were added as follows:

250 liters water
450 kg. sodium carbonate (55.5% $Na_2O$)
524 kg. phosphoric acid (76.5% $H_3PO_4$)
170 kg. sodium carbonate
197 kg. phosphoric acid
170 kg. sodium carbonate
197 kg. phosphoric acid
170 kg. sodium carbonate
402 kg. phosphoric acid The suspension contained 35.6% $P_2O_5$ and 26.0% $Na_2O$. The mixture was heated in a rotary kiln at 400–420° C. whereby sodium tripolyphosphate was obtained.

Example 4

The disodium orthophosphate suspension prepared in the manner described in Example 2 and containing 37.5% $P_2O_5$ and 32.5% $Na_2O$ was introduced into a mixing device provided with a cooling jacket. The mass was allowed to cool while being continuously stirred. A solid disodium orthophosphate which contained water of hydration was obtained in the form of a powder. The content of $Na_2HPO_4$ amounted to about 75%.

We claim:

In a process for neutralizing phosphoric acid having a concentration of above 40% by weight with solid soda at increased temperature to obtain suspensions and crystal slurries consisting of sodium orthophosphates with a molar ratio $P_2O_5/Na_2O$ of about 1:2 to about 3:5 which can be processed to form solid phosphates selected from the group consisting of sodium orthophosphate, sodium pyrophosphate, sodium tripolyphosphate and mixtures thereof, the improvement which comprises neutralizing stepwise the phosphoric acid with soda by suspending, of the total amount of soda to be used, a first portion of soda that can be suspended and uniformly mixed in a given mixture consisting of water and disodium phosphate, said mixture having a concentration within the range of an unsaturated solution and a crystal suspension, adding to the resulting suspension of soda in disodium phosphate a first portion of the total amount of said phosphoric acid to be added, said first acid portion being added in the amount, based upon the suspended soda, required for the formation of disodium phosphate, stirring the resulting suspension while adding said acid, suspending in the resulting reaction mixture a second portion of the total amount of soda and neutralizing this suspension with a second portion of the total amount of acid, repeating this cycle of suspending a portion of soda and neutralizing this portion with a corresponding portion of phosphoric acid until all of the starting material is reacted with the resultant formation of a crystal sludge, the amount of the last portion of acid adjusting the desired molar ratio $P_2O_5/Na_2O$ in the crystal sludge, and recovering the crystal sludge.

References Cited in the file of this patent

UNITED STATES PATENTS

| | | |
|---|---|---|
| 2,390,400 | Taylor | Dec. 4, 1945 |
| 2,747,964 | Bacon et al. | May 29, 1956 |
| 2,977,190 | Yates et al. | Mar. 28, 1961 |